Oct. 7, 1947.  J. F. BABBITT ET AL  2,428,540
MANUFACTURE OF METALLIC RINGS
Filed Oct. 24, 1942  2 Sheets-Sheet 1
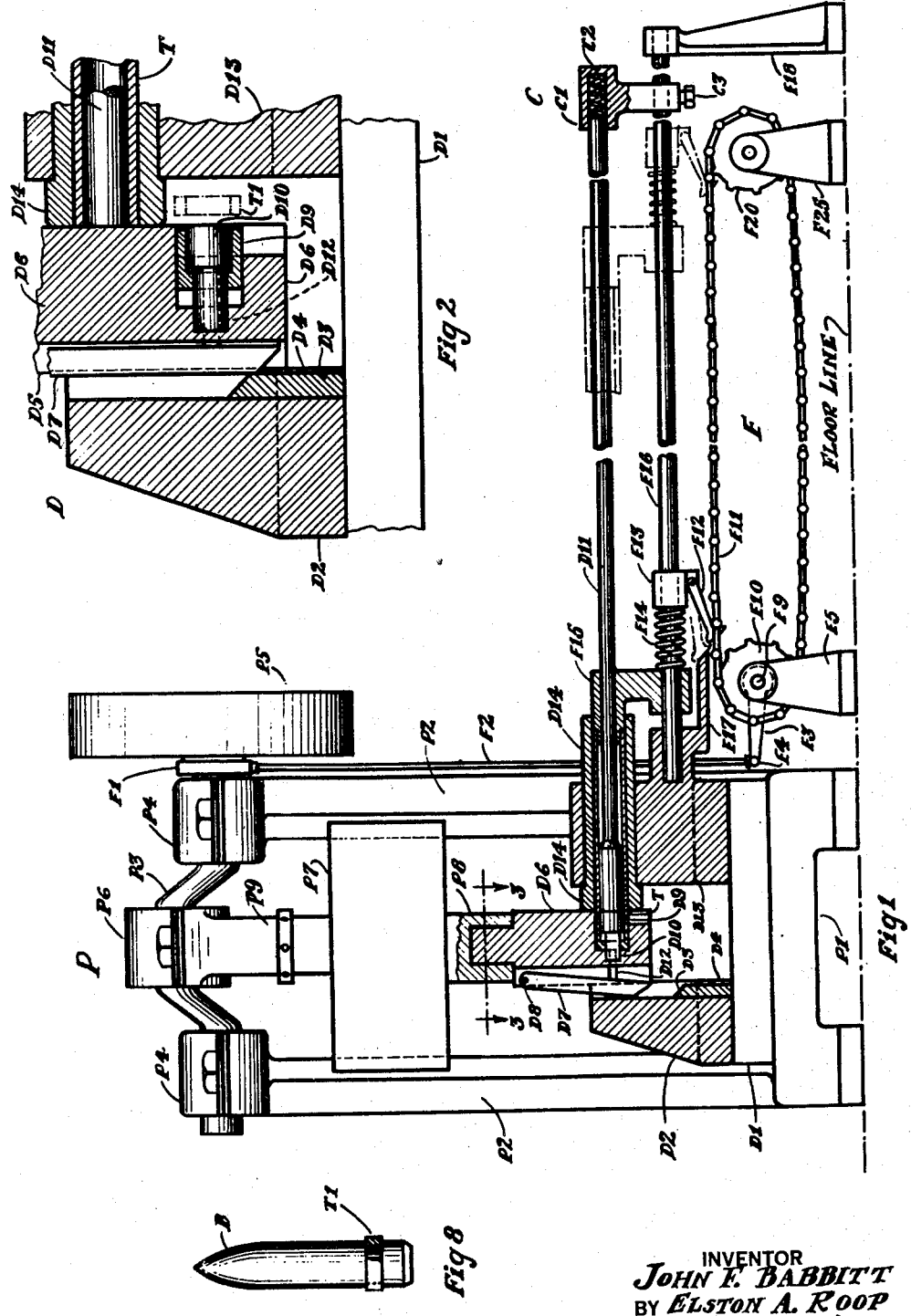
INVENTOR
JOHN F. BABBITT
BY ELSTON A. ROOP
John L. Milton
ATTORNEY

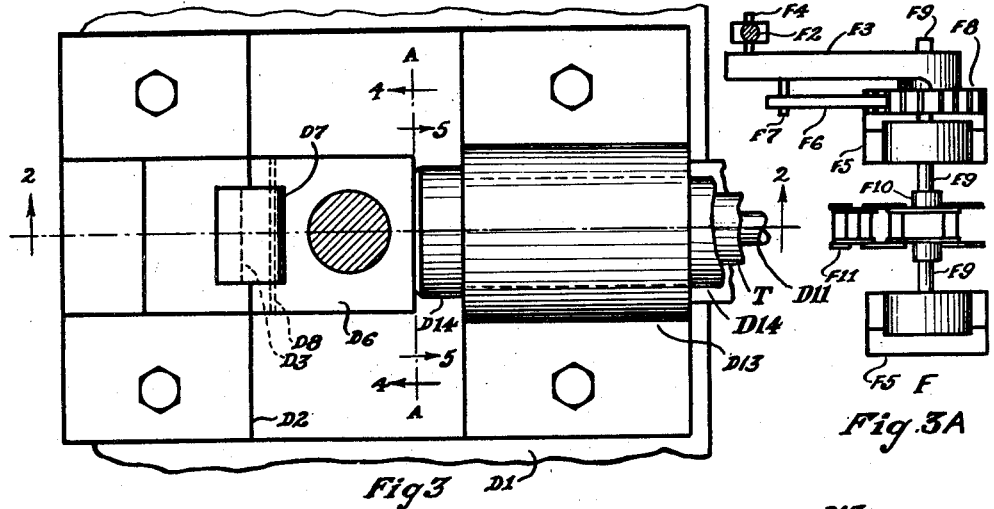
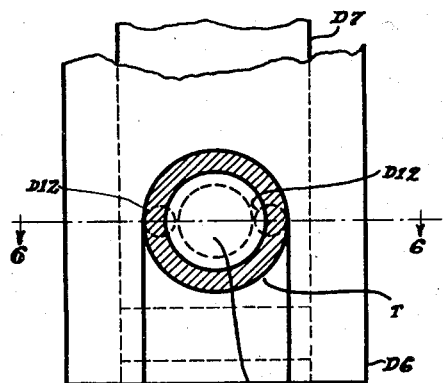
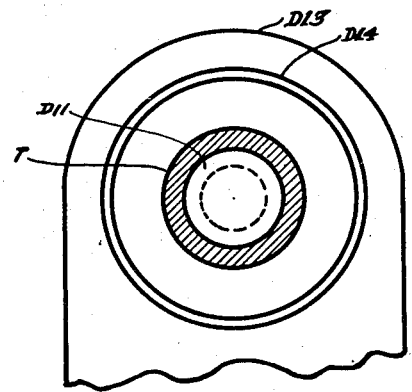
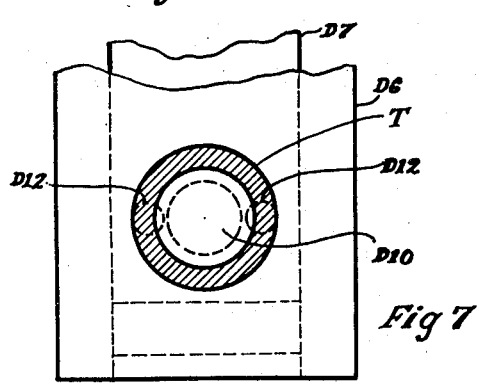
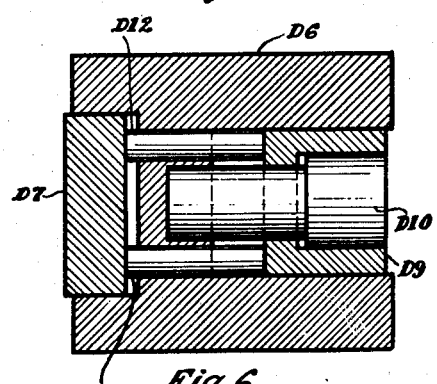
INVENTOR
JOHN F. BABBITT
BY ELSTON A. ROOP
ATTORNEY Patented Oct. 7, 1947

2,428,540

UNITED STATES PATENT OFFICE 2,428,540

MANUFACTURE OF METALLIC RINGS

John F. Babbitt and Elston A. Roop, Louisville, Ky., assignors to J. V. Pilcher Mfg. Company, Incorporated, Louisville, Ky., a corporation of Kentucky Application October 24, 1942, Serial No. 463,288

7 Claims. (Cl. 164—48)

This invention relates to a method and apparatus for cutting or shearing tubular articles and has particular reference to a method and apparatus for making metallic rings or ferrules from tubular stock.

The primary object of this invention is to provide a method and apparatus for rapidly cutting long lengths of tubing into shorter pieces of predetermined length having relatively smooth and squared ends.

Another object of this invention is to provide a method and apparatus for cutting tubing without waste of material in the cutting operation.

A further object of this invention is to provide a method and apparatus for cutting metallic tubing to form rings of a predetermined length, so that with each stroke of a rapidly reciprocating machine a ring is formed.

Another object of this invention is to provide a method and apparatus for continuously making metallic rings from tubular stock, wherein the tubular stock is continuously and automatically fed into the cutting instrumentalities of the machine, and each ring cut from the tubular stock is automatically ejected from the cutting instrumentalities of the machine.

A further object of this invention is to provide a method and apparatus for maintaining uniform pressure upon the metallic tubing as it is automatically and continuously fed into the cutting instrumentalities of the machine.

A still further object of this invention is to provide a method and apparatus for continuously and rapidly cutting metallic rings from tubular stock, and with extreme accuracy and uniformity of size and shape, so that such rings can be effectively employed as bands on projectiles.

The advantages of these and other objects will be manifested as the following description is read in connection with the accompanying drawings in which:

Figure 1 is a side elevational view of a machine embodying the invention, which machine is shown partially in section along the longitudinal axis of the metallic tubing R;

Figure 2 is an enlarged partial, elevational view shown partially in section on lines 2—2 of Figure 3, and illustrating the reciprocating member D6 in its extreme downward position and the sheared ring T1 ejected from the cutting die;

Figure 3 is a partial plan view of the machine shown partially in section along lines 3—3 of Figure 1;

Fig. 3A is a partial plan view of the ratchet mechanism employed to advance intermittently the chain F11;

Figure 4 is a partial end elevational view of the reciprocating member D6 shown partially in section along line A—A of Figure 3 as viewed in the direction of arrows 4—4;

Figure 5 is a partial end elevational view of the stationary member D13 shown partially in section along line A—A of Figure 3 as viewed in the direction of arrows 5—5;

Figure 6 is a sectional view taken along lines 6—6 of Figure 4;

Figure 7 is a modification of Figure 4 showing the reciprocating member D6 completely encircling the metallic tubing T; and Figure 8 is an elevational view of a projectile showing one application of the metallic ring T6 cut from the tubing T.

Referring now to Figure 1 of the drawings, it will be observed that the character P designates a conventional reciprocating press having a base P1 and upright arms P2—P2. A crankshaft P3 is journaled in suitable main bearings carried by the arms P2, which bearings are secured thereto by main bearing caps P4—P4. A slide P7 is reciprocatably mounted upon gibs carried by the arms P2, which slide is operatively connected to the cam shaft P3 by a pitman connection P9. The characters P6 designate a conventional pitman-cap, and it is to be understood that the pitman connection P9 is provided with a conventional pitman adjustment-screw and pitman ball-connection with the slide P7. The characters P8 designate a conventional slide connection to which is secured a reciprocating die-member D6. P5 designates a conventional fly-wheel to which is connected the operating power for the press and it is to be understood that the fly-wheel is provided with conventional sliding dogs which engage and disengage a suitable clutch connection between the fly-wheel P5 and camshaft P3.

The characters D1 designate a conventional bolster plate fixedly secured to the base of the press P1, and, as indicated in Figures 1, 2 and 3, stationary die-members D2 and D13 are fixedly secured thereto.

The reciprocating die-member D6 slides upon upright faces D4 of the stationary die member D2, and upon an upright face of a stationary shearing-sleeve D14, which sleeve is fixedly secured to the stationary die-member D13.

A stripping lever D7 is pivotally secured to the reciprocating die-member D6 at D8, which lever operatively engages a cam D3 fixedly secured to the stationary die-member D2.

In Figure 1 the reciprocating die-member D6 is illustrated in its extreme upward position, and in Figure 2 the reciprocating die member D6 is illustrated in its extreme downward position, and it will be observed that the stripping lever D7 engages the cam D3 in its extreme downward position and actuates the stripper pins D12.

Figures 4 and 6 show the relation between the stripping lever D7 and stripper pins D12, and it is to be noted that Figure 6 illustrates the lever D7 and pins D12 in their relative actuated positions in accordance with the relation of the corresponding parts shown in Figure 2.

With reference to Figure 6, it will be observed that a stripping cup D9 is slidably mounted upon a shearing mandrel D10, which mandrel is fixedly secured to the reciprocating die-member D6.

The stripper pins D12 are slidably mounted in the die-member D6, and are adapted to move the stripping cup D9 outwardly when the pins D12 are pressed inwardly by the stripping lever D7.

As indicated in Figures 1, 2, 4, 6 and 7, the diameter of the recess, within which the stripper cup D9 reciprocates, is substantially the same as the outside diameter of the tubing T, and the diameter of the shearing mandrel D10 is substantially the same as the inside diameter of the tubing T.

In Figures 1, 2, 4 and 6, the reciprocating die-member D6 is illustrated as being partially cut-away adjacent the lower half of the shearing mandrel D10. It has been observed that this arrangement allows for slight variations in the operation of the press and yet provide very satisfactory operation. However, in Figure 7, the reciprocating die-member D6 is illustrated as being solid adjacent the lower half of the shearing mandrel D10, and it is to be understood that either arrangement of the reciprocating die member can be employed without departing from the spirit of this invention.

As indicated in Figures 1, 2 and 5, the inside diameter of the stationary shearing-sleeve D14 is substantially the same as the outside diameter of the tubing T.

It will also be observed that a shearing mandrel D11 is mounted within the tubing T, and it is to be understood that the outside diameter of the mandrel D11 adjacent the shearing face of the sleeve D14 is substantially the same as the inside diameter of the tube T. Therefore, it will be apparent that, when the tubing T is fed through the sleeve D14 and into the recess in the reciprocating die-member D6, the tubing is supported both internally and externally and conditioned for a clean shearing along line A—A of Figure 3 without waste of material in the shearing operation.

To provide continuous and automatic shearing of the tubing T, a feeding mechanism F is provided, which mechanism is actuated by a pitman rod F2 operatively connecting a pitman F1 operatively associated with the crankshaft P3.

With reference to Figures 1 and 3 it will be observed that the rod F2 is pivotally secured at F4 to a lever F3, which lever is pivotally mounted upon a shaft F9.

The shaft F9 is pivotally mounted in stationary bearing supports F5, and has fixedly secured thereto a ratchet wheel F8 and a chain sprocket F10. A hook-type pawl F6 is pivotally mounted upon the lever F3 at F7, which pawl is adapted to advance the sprocket F10 counter-clockwise on each stroke of the press P.

A second chain sprocket F20 is mounted upon a shaft journal in bearing supports F25, and a sprocket chain F11 connects the sprockets F10 and F20.

A guide rod F16 is secured to the stationary die-member D13, which rod is supported at its outer end by a standard F18. A feeding member F15 is slidably mounted upon the shearing mandrel D11 and upon the guide rod F16, and a slide F13 is also slidably mounted upon the guide rod F16 adjacent the feed member F15.

As illustrated in Figure 1, a compression spring F14 transmits the motion of the slide F13 to the feeding member F15, and serves to maintain the tubing T biased toward the reciprocating die-member D6 under substantially uniform pressure. A hook F12 is pivotally secured to the slide F13, which hook operatively engages the chain F11 for advancing the feed member F15. An arm F17 is secured to the stationary die-member D13, which arm is engaged by the hook F12 near the end of travel of the feeding mechanism for disengaging the same from the chain F11.

In Figure 1 the feed mechanism F is illustrated, in solid lines, near the end of its travel, while the dot-dash lines to the right of Figure 1 indicate the relative positions of the parts near the beginning of the travel of the feed mechanism.

It is important to observe that the portion of the feed member F15 engaging the tube T is round, and has a diameter substantially the same as the outside diameter of the tube T. Thus, as shown in solid lines in Figure 1, the tube T is advanced into the shearing sleeve D14 when the feeding member F15 nears the end of its travel. Therefore, in reloading the mandrel D11, the feed member F15 is moved to the rear end of the mandrel D11 and until it disengages the same, whereupon the member F15 is rotated about the guide rod F16 so that a new tube can be placed upon the mandrel D11.

In placing the new tube on the mandrel D11, one end is inserted in the sleeve D14 and moved against the short length remaining within the sleeve. The feed member F15 is then brought to the position shown in dot-dash lines and placed in engagement with the tubing as shown.

It will be noted that a support C1 is provided for the outer end of the mandrel D11, which support is secured to the guide rod F16 by means of screw C3. A compression spring C2 is provided within the support C1, which spring serves to maintain the mandrel D11 biased towards the reciprocating die-member D6. Obviously, therefore, in placing a new tube on the mandrel D11, the screw C3 is loosened, and the support C1 moved rearwardly and in the clear of the tube being placed upon the mandrel D11.

While not shown, it is to be understood that the press base P1, bearing supports F5 and F25, and the standard F18 are fixedly secured to a suitable foundation.

In Figure 8, the ring T1 is illustrated applied to a projectile B, which ring is subsequently machined upon the projectile to form a sealing ring for sealing the gases behind the projectile during firing. However, even though the invention is expressly illustrated in this connection, it will be apparent to those skilled in the art that the teachings of the invention may be utilized for shearing tubing of different materials and for different uses. Therefore, it is to be understood that the invention is not to be limited other than by the scope of the appended claims.

Having thus described the invention, we claim:

1. In a machine for cutting rings from tubing, comprising a stationary die-member having an aperture therethrough for longitudinally receiving a tube and a shearing face at one end of the said aperture; a stationary guide-member spaced from the stationary die-member and having a guide face opposing the shearing face of the stationary die-member; a movable die-member movable in the space between the stationary die-member and the stationary guide member, and having a shearing face engaging the shearing face of the stationary die-member and a guide face engaging the guide face of the stationary guide-member, the said movable die-member having an aperture in the shearing face thereof for longitudinally receiving the end of the tube, and an ejector in alignment with the aperture therein; and means to move the movable die-member in the aforesaid space and to actuate the said ejector.

2. In a machine of the class described, comprising, a stationary die-member having a recess therein for receiving the stock, and a shearing face at one end of the said recess; a stationary guide-member spaced from the stationary die-member and having a guide face opposing the shearing face of the stationary die-member; a movable die member movable in the space between the stationary die-member and the stationary guide-member, and having a shearing face engaging the shearing face of the stationary die-member and a guide face engaging the guide face of the stationary guide-member, the said movable die-member having a recess in the shearing face thereof for receiving the end of the stock, and an ejector in alignment with the recess therein; and means to move the movable die member in the aforesaid space and to actuate the said ejector.

3. In a machine of the class described, comprising a stationary die-member having a shearing face; a stationary guide-member spaced from the stationary die-member and having a guide face opposing the shearing face of the stationary die-member; a movable die-member movable in the space between the stationary die-member and the stationary guide-member, and having a shearing face engaging the shearing face of the stationary die-member and a guide face engaging the guide face of the stationary guide-member, the said movable die member having a recess in the shearing face thereof for receiving the end of the stock, and an ejector in alignment with the recess therein; and means to move the movable die-member in the aforesaid space and to actuate the said ejector.

4. In a machine of the class described, comprising, a stationary die-member having a channel comprised by front and backing portions, the said front portion having an aperture therethrough for receiving stock and a shearing face at one end of the said aperture; a movable die-member movable in the channel and having a shearing face engaging the shearing face of the stationary die-member and a backing face engaging the backing portion of the stationary die-member, the said movable die-member having an aperture in the shearing face thereof for receiving the end of the stock, and an ejector in alignment with the aperture therein; and means to move the movable die-member in the channel and to actuate the said ejector.

5. In a machine of the class described, comprising, a stationary die-member having a channel comprised by front and backing portions and a recess in the front portion for receiving stock; a movable die-member movable in the said channel and having two faces engaging respectively the said front and backing portions of the stationary die-member, the said movable die member having a recess therein in cooperative relation with the recess in the front portion of the said stationary die member, for receiving the end of the said stock, and an ejector in alignment with the recess therein; and means to move the movable die member in the channel and to actuate the said ejector.

6. In a machine of the class described, comprising a stationary die-member having a channel comprised by front and backing portions, a movable die-member movable in the channel and having two faces engaging respectively, the said front and backing portions of the stationary die-member, the said movable die-member having a recess therein for receiving the end of the stock; an ejector slidably mounted within the recess; a lever pivotally mounted upon the said movable die-member, and adapted to actuate the said ejector; means for moving the movable die-member in the said channel; and cam means carried by the stationary die-member and adapted to actuate the aforesaid lever when the movable die-member is moved in the aforesaid channel, for actuating the said ejector.

7. In a machine for the purposes set forth, comprising a die-block having a channel comprised by front and backing portions, a die movable in the channel, two faces of the die engaging respectively the said front and backing portions of the die-block, the die having a recess to receive the end of the stock and an ejector in alignment with the recess, and means to move the die in the channel and actuate the ejector.

JOHN F. BABBITT.
ELSTON A. ROOP.

REFERENCES CITED

The following references are of record in the file of this patent:

UNITED STATES PATENTS

| Number | Name | Date |
|---|---|---|
| Re. 11,533 | Hume | Apr. 21, 1896 |
| 584,658 | Aiken | June 15, 1897 |
| 541,996 | Fox | July 2, 1895 |
| 771,752 | Stafford | Oct. 4, 1904 |